(12) United States Patent
Hohl et al.

(10) Patent No.: US 10,162,714 B2
(45) Date of Patent: Dec. 25, 2018

(54) METHODS AND SYSTEMS FOR RESTORING DATA CONTAINERS IN A STORAGE SYSTEM

(71) Applicant: NETAPP, INC., Sunnyvale, CA (US)

(72) Inventors: Adolf Hohl, Stuttgart (DE); Kapil Arora, Munich (DE)

(73) Assignee: NETAPP, INC., Sunnyvale, CA (US)

( * ) Notice: Subject to any disclaimer, the term of this patent is extended or adjusted under 35 U.S.C. 154(b) by 354 days.

(21) Appl. No.: 14/837,464

(22) Filed: Aug. 27, 2015

(65) Prior Publication Data

US 2017/0060699 A1    Mar. 2, 2017

(51) Int. Cl.
*G06F 11/14*    (2006.01)
*G06F 17/30*    (2006.01)

(52) U.S. Cl.
CPC .... *G06F 11/1469* (2013.01); *G06F 17/30575* (2013.01); *G06F 2201/80* (2013.01)

(58) Field of Classification Search
CPC .......... G06F 11/1469; G06F 17/30575; G06F 2201/80; G06F 11/1451
USPC ......................................................... 707/645
See application file for complete search history.

(56) References Cited

U.S. PATENT DOCUMENTS

| | | | | |
|---|---|---|---|---|
| 8,010,495 B1* | 8/2011 | Kuznetzov | .......... | G06F 9/45533 707/639 |
| 8,504,529 B1* | 8/2013 | Zheng | ................. | G06F 11/1469 707/679 |
| 2002/0067693 A1* | 6/2002 | Kodialam | ............... | H04L 45/12 370/216 |
| 2008/0147754 A1* | 6/2008 | Littlefield | ............. | G06F 17/302 |
| 2010/0268568 A1* | 10/2010 | Ochs | .................. | G06Q 10/0633 705/7.27 |
| 2010/0293147 A1* | 11/2010 | Snow | ................ | G06F 17/30067 707/640 |
| 2011/0060722 A1* | 3/2011 | Li | ........................ | G06F 11/2038 707/649 |
| 2012/0203742 A1* | 8/2012 | Goodman | ........... | G06F 11/1451 707/646 |
| 2013/0339299 A1* | 12/2013 | Muller | .............. | G06F 17/30283 707/640 |
| 2014/0310247 A1* | 10/2014 | Vijayan | ............... | G06F 11/1469 707/679 |
| 2014/0337664 A1* | 11/2014 | Gokhale | ............. | G06F 11/1464 714/6.3 |
| 2015/0074536 A1* | 3/2015 | Varadharajan | .... | G06F 17/30233 715/734 |
| 2015/0215200 A1* | 7/2015 | Bottari | ................. | H04Q 3/0079 370/228 |

* cited by examiner

*Primary Examiner* — Hosain T Alam
*Assistant Examiner* — Nicholas E Allen
(74) *Attorney, Agent, or Firm* — Klein, O'Neill & Singh, LLP

(57) ABSTRACT

Methods and systems for recovering data containers is provided. One method includes creating a first set of one or more incremental backups for a data container; associating by a processor the first set of one or more incremental backups with the first full backup of the data container; presenting the association of the first set of one or more incremental backups with the first full backup; and restoring the data container within a recovery time period associated with the data container.

20 Claims, 10 Drawing Sheets

METHODS AND SYSTEMS FOR RESTORING DATA CONTAINERS IN A STORAGE SYSTEM

COPYRIGHT NOTICE

A portion of the disclosure herein contains material to which a claim for copyrights is made. The copyright owner, the assignee of this patent application, does not have any objection to the facsimile reproduction of any patent document as it appears in the USPTO patent files or records, but reserves all other copyrights.

TECHNICAL FIELD

Aspects of the disclosure generally relate to the field of storage systems, and, more particularly, to recovery of data containers that are backed by a storage system.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices.

Storage systems are being used extensively by different applications, for example, electronic mail (email) servers, database applications, virtual machines executed within virtual machine environments (for example, a hypervisor operating environment) and others to store data and protect the data using backups. To provide protection against data corruption or loss, data stored for various applications may be periodically backed up. A backup may be a full backup, in which all of the data is copied (e.g., a snapshot of a database is taken) and stored, or it may be an incremental backup in which a portion of the data that has changed since the last backup is copied and stored. Both the full backup and the incremental backup may be used to restore a data container to a desired recovery point.

In conventional systems, it is cumbersome to obtain information regarding data protection status and one may have to toggle through multiple interface to obtain data protection status. When performing restore operations, it is difficult to verify if recovery can be performed within defined service levels. Continuous efforts are being made to improve data protection management.

BRIEF DESCRIPTION OF THE DRAWINGS

The foregoing features and other features of the disclosure will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods and systems for recovering data containers is provided. One method includes creating a first set of one or more incremental backups for a data container; associating by a processor the first set of one or more incremental backups with the first full backup of the data container; presenting the association of the first set of one or more incremental backups with the first full backup; selecting a recovery path for restoring the data container without violating a recovery time associated with the data container for restoring the data container; and restoring the data container using the selected recovery path.

Figure 1:
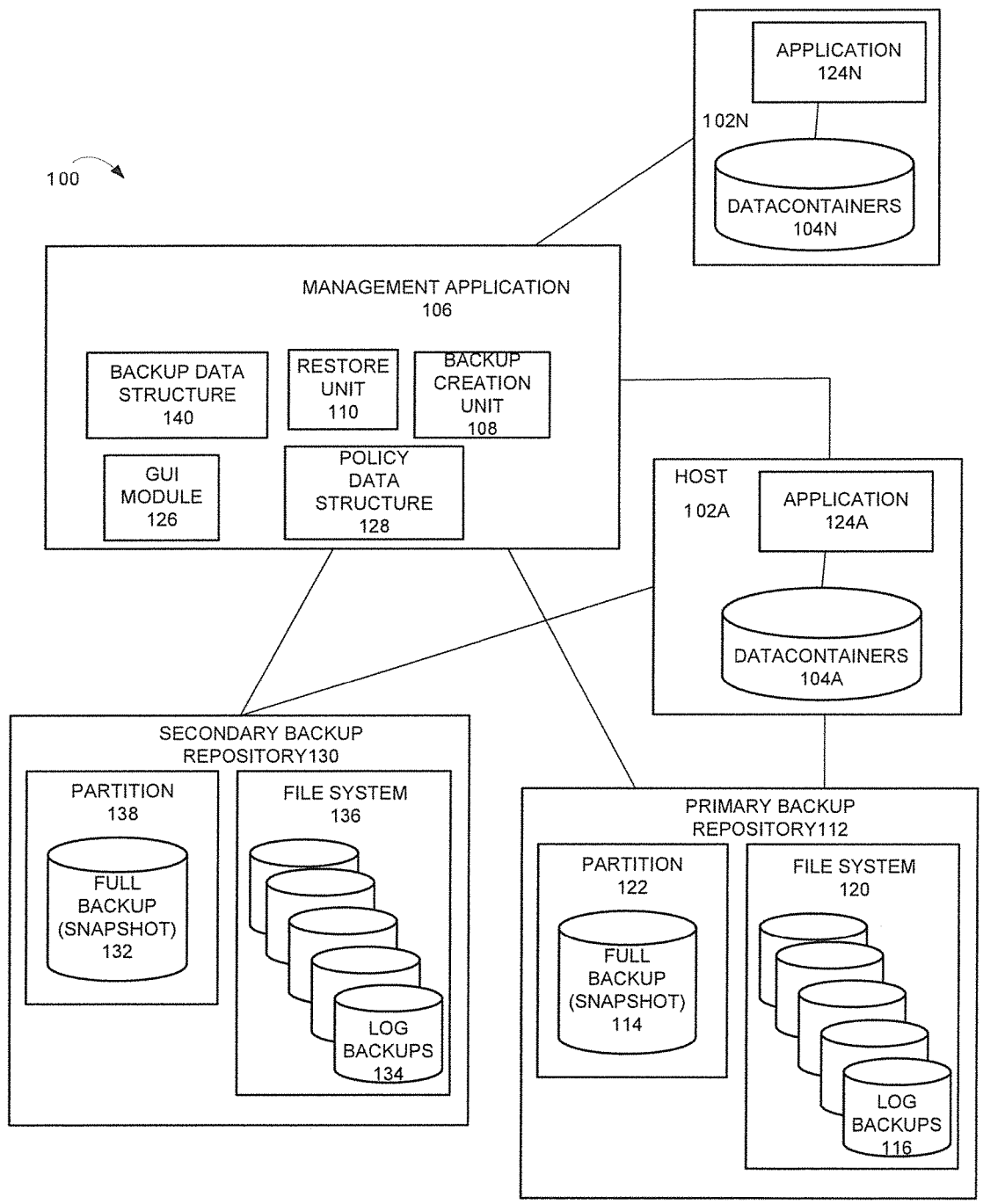
FIG. 1 depicts a system for managing backups, according to one aspect of the present disclosure.

System 100:

FIG. 1 depicts a system 100 for executing the adaptive aspects of the present disclosure. System 100 includes a plurality of computing devices 102A-102N (maybe be referred to as a host system(s) or server (s) 102) executing one or more applications 124A-124N (may be referred to as application or applications 124). These applications may include database, email, accounting and other application type. The various adaptive aspects of the present disclosures are not limited to any application type. As an example, application 124 may implement an Oracle® database system, a Microsoft® SQL Server® database system, or any other system (without derogation of any third party trademark rights).

Data for the applications 124 may be stored as data containers 104A-104N (may be referred to as data container (s) 104). Data containers 104 may include files, databases, structured or unstructured data. As an example, data containers 104 maybe a relational database having tables, columns, indexes, etc., common to relational databases. Alternatively, data container 104 can be an object oriented database, a hierarchical database, or any other type of database. It is noteworthy that although the description provided herein may use the term database and data container interchangeably, for example, by referring to data container 104 as database 104, the various aspects of the present disclosure is not limited to databases or any particular database type. It is also noteworthy that although data containers 104 are shown as part of host systems 102, the data containers may be stored across one or more storage devices that may be local to the host systems or accessible via a network connection.

System 100 also includes a primary backup repository 112 and a secondary backup repository 130 for protecting application data and information. According to one aspect, the backup repository 112 maintains full backups 114 and log backups 116 of data containers 104. Backup repository 112 can be some or all of a storage device partition 122, a set of one or more files in a file system 120, or a combination of the two. Storage device partition 122 and file system 120 can be at a local disk, a LUN (logical unit) in a SAN (Storage Area Network), or any other storage unit in a storage subsystem that is managed by or is a part of a storage system.

Full backup 114 can be a backup copy or a snapshot of data containers 104. Full backup 114 represents the complete set of data at the point in time that the full backup was made. Full backup 114 can be created using backup tools provided by host system 102 (e.g., native tools). Such backups may be referred to as native backups. Additionally, full backup 114 can be created using file system or partition tools that are provided separately from application 124. For example, the Microsoft Volume Shadow Copy Service (VSS) can be used to create a snapshot copy of data container 104. Other tools that create a snapshot of the database 104 may also be used. In the example illustrated in FIG. 1, full backup 114 is shown as residing in partition 122. However, in some aspects, full backup 114 may be one or more files within file system 120. The file system 120 that maintains the log backups 116 can be any type of file system. The file system can be local to a system 100, or it can be a distributed file system.

Log backups 116 are incremental backups that are created after a full backup 114 is created. Each log backup contains data that has been updated since a previous log backup. As an example, log backups 116 can be a transaction log backup or redo log backup. Each log backup contains transactions that have been performed after a previous log backup was created. Alternatively, log backups 116 can be incremental or differential backups, where each log backup contains data that has changed after a previous log backup was created. If a database is to be restored, some or all of the log backups 116 can be applied to a given full backup 114. The log backups are typically applied in the order that the log backups were taken. The log backups 116 in a file system 120 may be associated with different full backups as will be further described below.

Log backups 116 are associated with the full backup 114 and form a recovery path. To restore a database, an application of a storage system element such as a management application 106 can automatically perform a new full backup. As described below, log backups subsequent to the creation of the new full backup are associated with the new full backup forming an alternative recovery path. The association can be made using one or more of a backup identifier, a time stamp, a sequence number etc. Further restorations of the database may occur over time. At each restoration, the management application 106 can perform a full backup that forms a new recovery path. The management application 106 associates the new recovery path with the full backup. Over time, numerous recovery paths may exist, with each recovery path including log backups that are associated with a different full backup. For a restore operation or any similar operation such as cloning a database, a user can select a desired full backup. Upon selection of the desired full backup, the management application 106 can determine the recovery path appropriate to the selected full backup by identifying a sequence of log backups. The database restoration operation can then be performed using the selected full backup and the appropriate log backups.

In the example illustrated in FIG. 1, database 104 is stored in a database partition that maybe separate from the backup partition 122 and file system 120 that maintains the log backups 116. In alternative aspects, database 104 may be stored in the same partition 122 that stores backups or snapshots of the databases or in the same file system 120 as log backups 116. Although one database 104 and one full backup 106 are illustrated in FIG. 1, a system 100 may include more than one database and more than one full backup.

The secondary backup repository 130 also includes full backups 132 at partition 138 (similar to 122) and log backups 134 at file system 136 (similar to 120), similar to 114 and 116 described above with respect to the primary backup repository 112. The secondary backup repository 130 may be used for disaster recovery in case the primary backup repository 112 becomes unavailable. The primary and the secondary repositories may be connected by a network connection or any other connection type.

In one aspect, the primary and secondary repositories 112 and 130 are part of a storage system that has access to a set of mass storage devices within at least one storage subsystem. The storage devices (for example, partition 122 and 138) may include writable storage device media such as magnetic disks, video tape, optical, DVD, magnetic tape, non-volatile memory devices for example, self-encrypting drives, flash memory devices and any other similar media adapted to store structured or non-structured data. The storage devices may be organized as one or more groups of Redundant Array of Independent (or Inexpensive) Disks (RAID). The various aspects disclosed are not limited to any particular storage device or storage device configuration.

The storage system provides a set of storage volumes to the host systems 102 via a connection system (not shown). A storage operating system may be used to present or export data stored at storage devices as a volume (or logical unit number (LUN)). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all of the storage space in multiple storage devices, a RAID group, or any other suitable set of storage space.

The storage system may be used to store and manage information at storage devices based on a request generated by application 124 executed by the host system 102. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FC).

The storage system maybe a stand-alone system, i.e. a non-cluster based system, or may have a distributed architecture; for example, a cluster based system that may include a separate network module and a storage module. Briefly, the network module is used to communicate with host platforms 102, while the storage module is used to communicate with storage devices. The network and storage modules may communicate with each other using an internal protocol. Alternatively, the storage system may have an integrated architecture, where the network and data components are included within a single chassis. The storage system further may be coupled through a switching fabric to other similar storage systems (not shown) which have their own local storage subsystems. In this way, all of the storage subsystems can form a single storage pool, to which any client of any of the storage servers has access.

Referring back to FIG. 1, in one aspect, the management application 106 of system 100 maybe a processor executable application used to configure the various components of system 100 including establishing service level objectives for applications and databases. For example, management application 106 may include functions and policies that may be used to create backups (both full backup 114 and log backups 116) and may include functions to restore and recover a database 104 from a full backup 114 and one or more log backups 116.

Backups could be taken on-demand or may be a part of a backup schedule defined by a policy data structure 128 that determines when backups are taken. As an example, the policy data structure 128 may store information to take a full backup every day and log backups every hour. Policy data structure 128 may also include information for taking full and log backups at only the primary repository 112 or at both the primary and secondary repositories 112 and 130, respectively. The policy data structure 128 may also store information that provides a service level objective (SLO) for an application and/or a database that guarantees a certain restoration time for a database. The SLO is part of a service level agreement (SLA) between a client and a storage provider (for example, a cloud service provider (not shown) that provides access to storage space as well as access to backup and restore functions). The SLA may provide for a duration within which a database may have to be restored for an application/client. The various aspects described below provide methods and systems for managing the SLOs for restore operations.

In one aspect, management application 106 includes a backup creation unit 108 to coordinate taking full backups 114 and 132 and log backups 116 and 134 at both the primary and secondary site, respectively. Information regarding the backups is stored at a storage device as backup data structure 140. Although the data structure 140 is shown as a single block, the information regarding the backups may be stored at one or more data structures at different storage locations. The backup data structure 140 identifies a backup by a unique identifier, includes a time stamp of when the backup was created, a client associated with the backup, a data container identifier identifying the data container that is backed up and any other information.

The management application 106 also includes a restore unit 110 that is used to select a recovery path with a full backup and any associated log backups for restoring a database. In one aspect, selection of the recovery path is to ensure compliance with SLAs for applications. It is noteworthy that the backup creation unit 108 and the restore unit 110 may be implemented in different computing devices.

In one aspect, the backup creation unit 108 and restore unit 110 may be implemented as a processor executable, application programming interface (API) which provides a set of routines, protocols, and tools for building a processor executable software application that can be executed by a computing device. When implemented as one or more APIs, then the backup creation unit 108 and restore unit 110 provides software components' in terms of its operations, inputs, outputs, and underlying types. The APIs may be implemented as plug-in APIs which may interface with other management applications.

In one aspect, management application 106 further includes or provides a graphical user interface (GUI) module 126 that presents backups and log backups on a display device (not shown). The display provides a visual representation of various backups and log backups with options for selecting recovery paths for a restore operation. The display may be based on the backup data structure 140. As described below in detail, the display maybe used to view estimated recovery/restore time compared to a SLA commitment.

Figure 2:
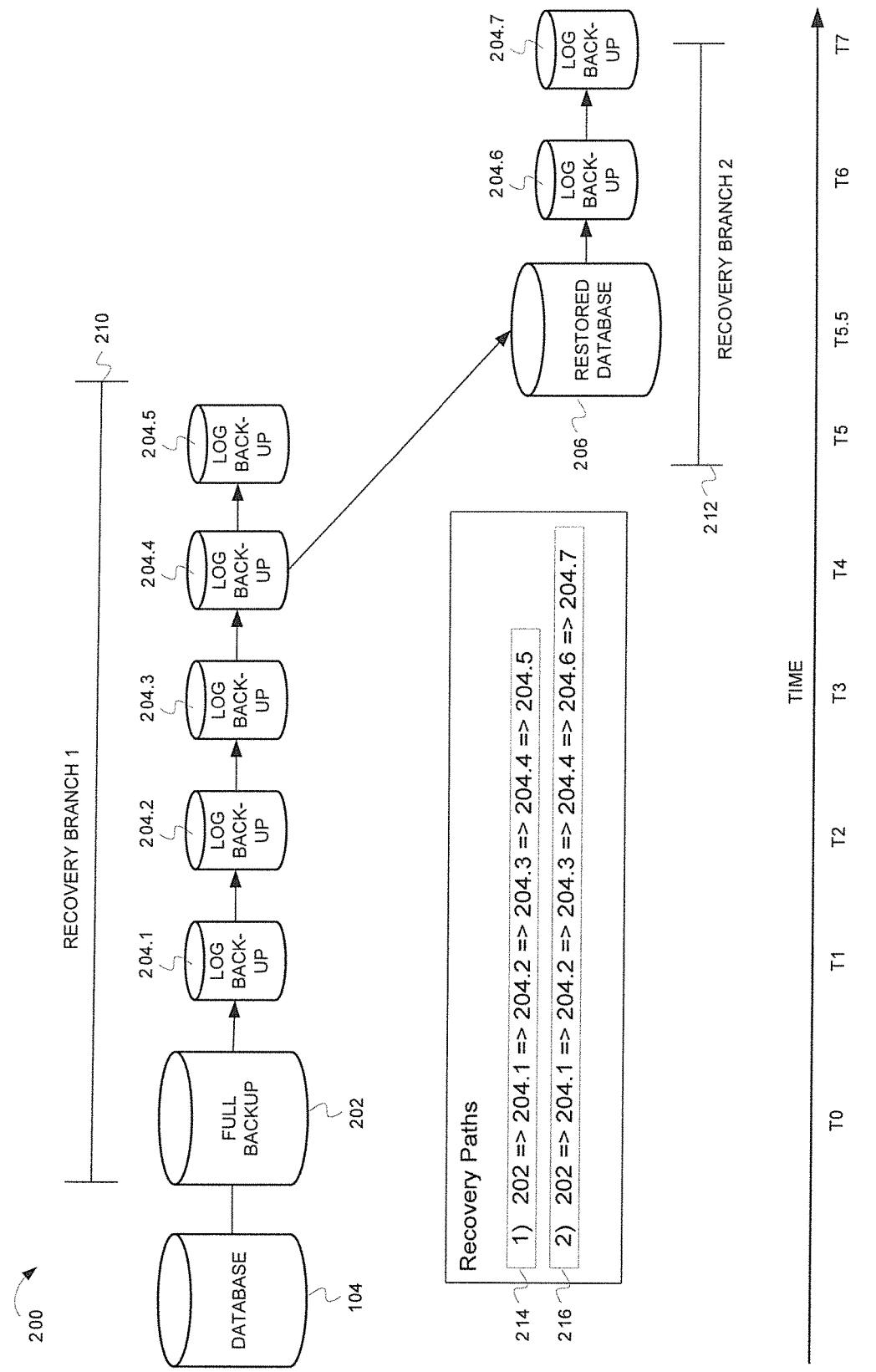
FIG. 2 illustrates an example timeline of full and log backups used according to one aspect of the present disclosure.

FIG. 2 illustrates an example timeline 200 for restoring a database using a full backup and log backups with multiple recovery paths. For the purposes of this example, assume that at time t=0, a full backup 202 is made of a database 104. After the full backup 202, a series of incremental backups are created. For example, at time t=1, log backup 204.1 is created. Later, at time t=2, log backup 204.2 is created. Similarly, at times t=3 through t=5, log backups 204.3-204.5 are created. For the purposes of this example, assume that at some point in time between t=4 and t=5, erroneous data is introduced into database 104. Thus, at time t=5, log backup 204.5 can include the erroneous data, while log backup 204.4 does not include the erroneous data. Thus a user may desire to restore the database to a point in time prior to t=5. The user can perform a restore operation on database 206 at time t=5.5 (i.e., at some point in time between t=5 and t=6) by using full backup 202 to create an initial version of restored database 206 and then applying log backups 204.1-204.4 to the restored database 206 to bring the restored database 206 to the state of database 104 as of time t=4. Log backup 204.5 is not applied because it contains the erroneous data. After restoring the database 206, at times t=6 and t=7, log backup 204.6 and log backup 204.7 may be created, with further log backups being created as time goes on.

In order to restore a database from a full backup to a particular point in time, relevant log backups among the available log backups (e.g., log backups 204.1-204.7) can be applied in a sequence after the full backup is applied. The log backups can be applied in the order of the time the log backups were taken. In some aspects, a log sequence number (LSN) may be available in each log backup or full backup header. The LSN may be used to determine the order of a log backup in a sequence of log backups. The LSN can be used to identify the first log backup to be applied after the full backup. Subsequent log backups can be applied in the order of time or LSN one after the other until the log backup corresponding to the desired point in time is reached.

As can be seen in FIG. 2, two recovery paths exist over time. A first recovery path 214 includes log backups 204.1-204.5 from the recovery branch 210 that can be applied to full backup 202. A second recovery path 216 includes log backups 204.1 to 204.4 from recovery branch 210 and log backups 204.6, 204.7 from recovery branch 212 that can be applied to the same full backup 202. Even though log backup 204.6 and log backup 204.7 occur after t=5 they cannot be applied on top of log backup 204.5 because log backups 204.6 and 204.7 are taken after the database 104 is restored to a previous point in time. However the log backups 204.6 and 204.7 can be applied after log backup 204.4 is applied.

The example illustrated in FIG. 2 only includes two recovery branches 210 and 212 and two recovery paths 214 and 216. However, in a typical case, there can be multiple databases and there can be many different recovery branches for each of the databases, resulting in many different potential recovery paths. When there are multiple recovery branches, it can be extremely difficult to identify the desired recovery path with the right sequence of log backups that can be applied after a full back up in order to restore a database to a desired state or point in time. It becomes even more challenging when SLAs are associated with databases/applications there are SLOs for recovery times. In one aspect, as described in detail, the display provided by the GUI module 126 enables recovery path selection as well as proactive corrective action when a recovery time SLA for a database is not met.

Figure 3:
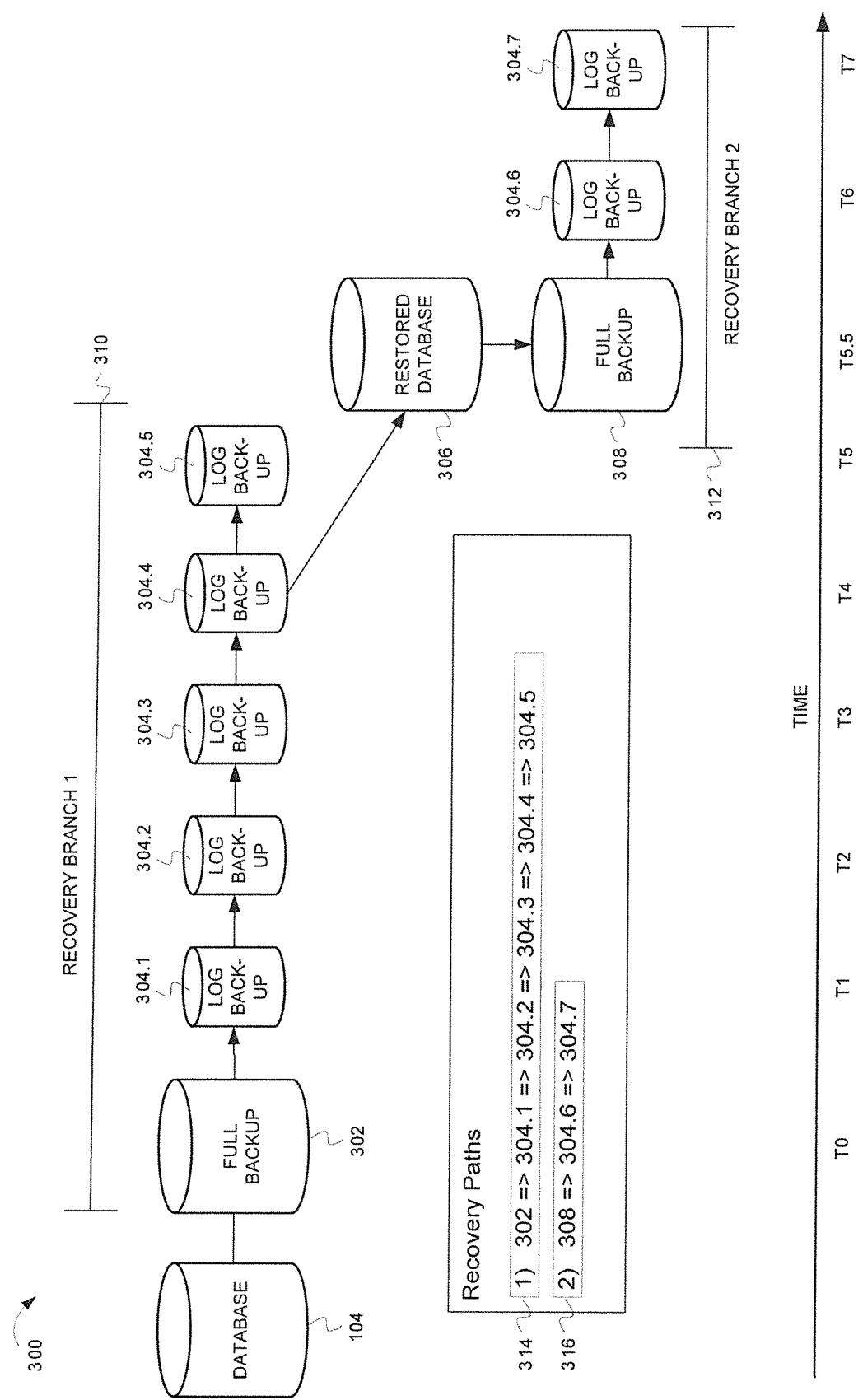
FIG. 3 illustrates an example timeline including a full backup taken after a restore operation, according to one aspect of the present disclosure.

FIG. 3 is similar to FIG. 2 but illustrates an example timeline where a new full backup 308 is taken immediately after a database is restored. In the example illustrated in FIG. 3, a series of log backups are applied to a previous full backup 302 to create restored database 306. According to some features of the disclosure, a new full backup 308 is automatically created in response to the restoration of the database. For example, management application 106 (FIG. 1) can cause a snapshot or native full backup 308 of the restored database 306 to be performed. As noted above, a snapshot backup can be desirable as it can typically be completed more rapidly than a native backup.

After creation of full backup 308, log backups 304.6 and 304.7 can be created. For example, log backups 304.6 and 304.7 may be created according to a backup schedule or policy. A full backup can be associated to a list of log backups in a sequence. Thus management application 106 associates log backups from 304.1-304.5 with full backup 302. Log backups 304.6, 304.7 created after the full backup 308 is created are associated to the full backup 308.

Figure 4:
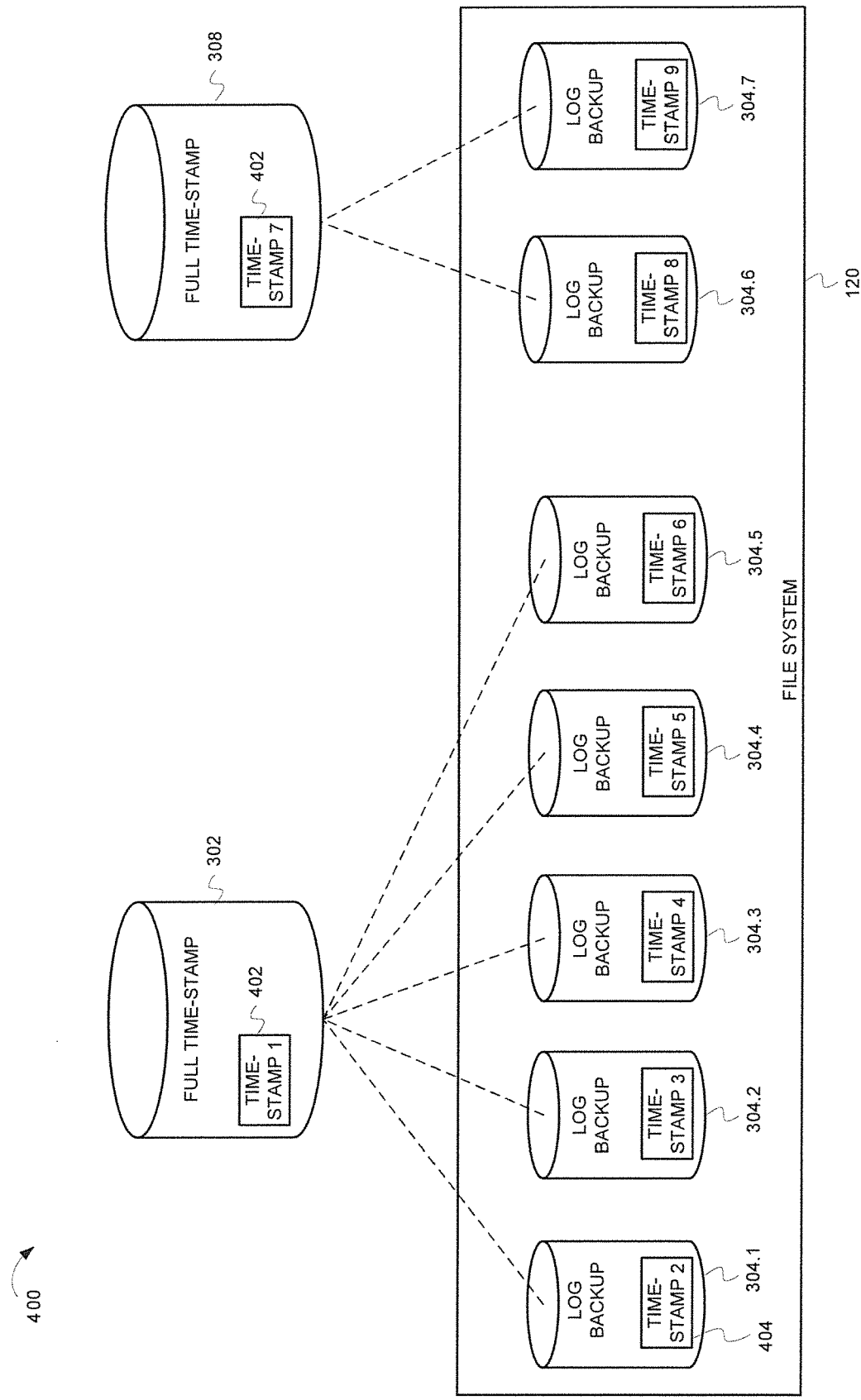
FIG. 4 illustrates associating a collection of log backups with full backups using time stamps, according to one aspect of the present disclosure.

FIG. 4 illustrates associating by the management application 106 a collection of log backups with full database backups using time stamps. Continuing with the example illustrated in FIG. 3, a first full backup 302 of a database is created and given a time stamp 402. The time stamp 402 may be maintained in various ways. For example, the time stamp may be provided in a data record at backup data structure 140 or header of the full backup 302. Alternatively, the time stamp 402 may be a time stamp that is associated with a file maintained in a file system that comprises the backup 302. Other mechanisms for providing a time stamp may be used.

As log backups are created (e.g., log backups 304.1-304.7), the log backups are also provided a time stamp 404 indicating the time the log backup was created. As with the backup time stamp 402, the log backup time stamp 404 may be in a data record or header in the log backup or it may be maintained as a file system time stamp associated with the file that comprises the log backup.

In the example illustrated in FIG. 4, time stamps 402 and 404 are shown as having a value of "time stamp n", where n is used in the figure to indicate a time order. Thus "time stamp 1" is a time value that represents a point in time before "time stamp 2", which is a time value that represents a point in time before "time stamp 3," etc. The management application 106 or any other application can associate log backups with full backups using the time stamps.

In the example illustrated in FIG. 4, log backups 304.1-304.5 having time stamp values 2-6 respectively are associated with full backup 302, because their respective time stamp values occur after the full backup 302 and before the database restoration 306. Log backups 304.6, 304.7 are not associated to the full backup 302 because they occurred after the database restoration 306. In some aspects, other information from the backup information can be used to determine the log backups that can be applied to a full backup. For example, LSN values and "RecoveryID" details can be used to determine that log backups 304.6, 304.7 cannot be applied to the full backup 302. If the database restoration has not taken place and if the log backups occur in the same order, then full backup 302 could be associated to the log backups from 304.1-304.7. However, in the example illustrated in FIG. 4, log backups 304.6 and 304.7 having time stamps 8 and 9 respectively can be associated with full backup 308 because they occur after the time that full backup 308 was created (e.g., after "time stamp 7").

Figure 5:
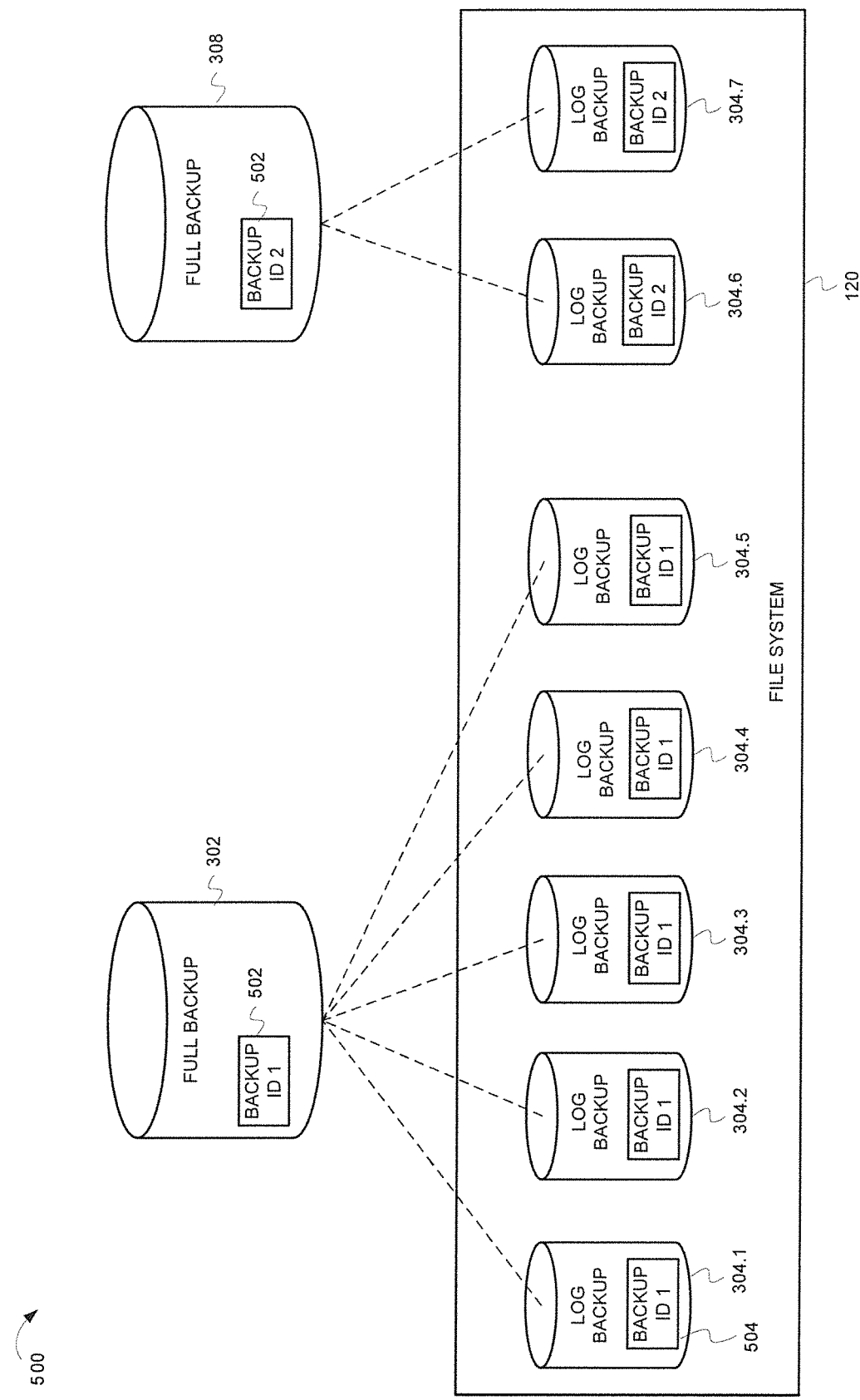
FIG. 5 illustrates a collection of log backups associated with full backups using a backup identifier, according to one aspect of the present disclosure.

FIG. 5 illustrates associating by the management application 106 a collection of log backups with full database backups using a backup identifier. In some aspects of the disclosure, a full backup (e.g., full backup 302 and 308) is assigned a unique backup identifier 502. Continuing with example illustrated in FIG. 3, FIG. 5 illustrates a full backup 302 that, upon creation, is assigned a backup identifier 502, indicated as "BACKUP IDENTIFIER 1". As an example, in systems utilizing SQL Server, when a full backup is created, an identifier referred to as a "last_recovery_fork id" (also referred to as a "RecoveryForkId") is assigned to the full backup. The RecoveryForkId can be used as a backup identifier 502. In the example shown in FIG. 5, a RecoveryForkId is assigned to the full backup 302 (created at time t=0 in FIG. 3). Log backups 304.1-304.7 also have a backup identifier 504. The system assigns a value for backup identifier 504 of log backups 304.1-304.5 (created from full backup 302) that is the same value as that of backup identifier 502 of the full backup 302. For example, in SQL Server based systems, the log backups 304.1-304.5 can be assigned the same RecoveryForkID value as used for backup identifier 502 for full backup 302. Similarly, full backup 308 (created at time t=5.5 in FIG. 3) is assigned a different value for backup identifier 502 (e.g., a different RecoveryForkId) because the full backup 308 is taken after creation of restoration database 306 in FIG. 3. Also, the subsequent log backups 304.6 and 304.7 are assigned the same value for backup identifier 504 (e.g., the same RecoveryForkId) as the identifier value assigned to backup identifier 502 for full backup 308.

Management application 106 (FIG. 1) can separate the various chains of log backups based on the backup identifier 504 and associate the log backups to their corresponding full backup. The backups and the log backups can then be displayed via a GUI. Thus for the full backup 302, log backups from 304.1-304.5 can be selected and applied for a database operation. Log backup 304.6 will not be applied after 304.5, because log backup 304.6 will have a different value for backup identifier 504 (e.g., a different RecoveryForkID). Likewise, for full backup 308 the log backups 304.6 and 304.7 can be automatically selected and applied based on the match between the value of backup identifier 502 in full backup 308 and the values of log backup identifier 504 in log backups 304.6 and 304.7.

Figure 6:
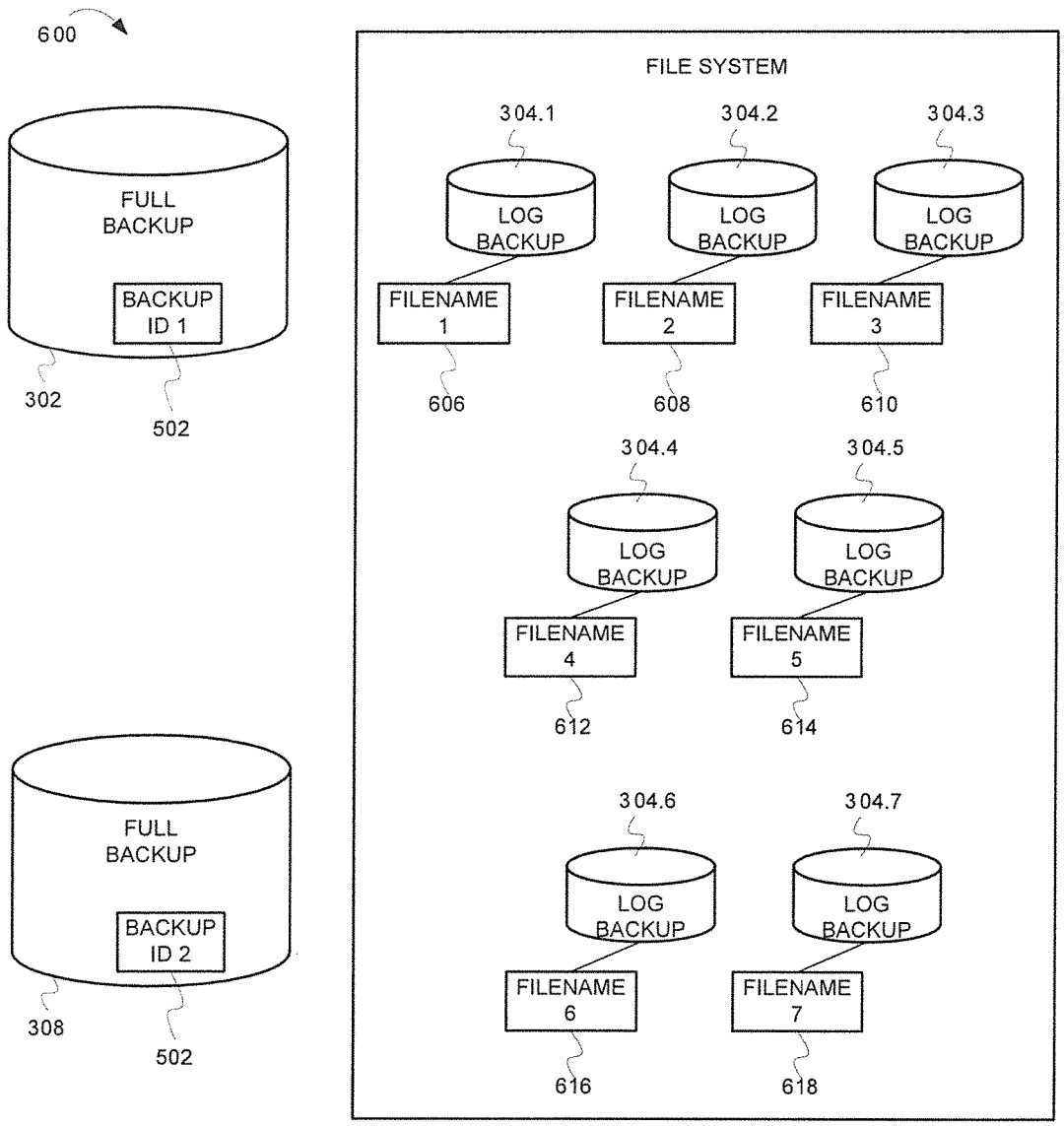
FIG. 6 illustrates a collection of log backups associated with full backups using an association data structure, according to one aspect of the present disclosure.

FIG. 6 illustrates associating by the management application 106 a collection of log backups with full database backups utilizing an association data structure (shown as a table for illustration) that may be a part of backup data structure 140. Again continuing with the example of FIG. 3, a feature of alternative aspects of the disclosure utilizes a data structure 620 to associate a file name of a log backup (e.g., log backups 304.1-304.7) in a file system with a backup identifier 502 of a full database backup. In the example illustrated in FIG. 6, each of log backups 304.1-304.7 includes a file name that can be used to uniquely identify the log backup in the file system. Data structure 620 provides an association of file names to full backup identifiers. Thus in the example illustrated in FIG. 6, data structure 620 associates file names representing log backups 304.1-304.5 with backup identifier 502 value "BACKUP ID 1" assigned to full backup 302. Data structure 620 associates file name 616 and file name 618 with backup identifier 502 value "BACKUP ID 2" assigned to full backup 308. Other identifiers can be used to associate log backups with their corresponding full backup. For example, data structure 620 can associate a full backup name with the log backup file names.

The examples shows above with respect to FIGS. 4, 5 and 6 may be used to display backups and log backups within a GUI presented by GUI module 126. The displayed backups and log backups enable SLA validation, as described below in detail.

Figure 7:
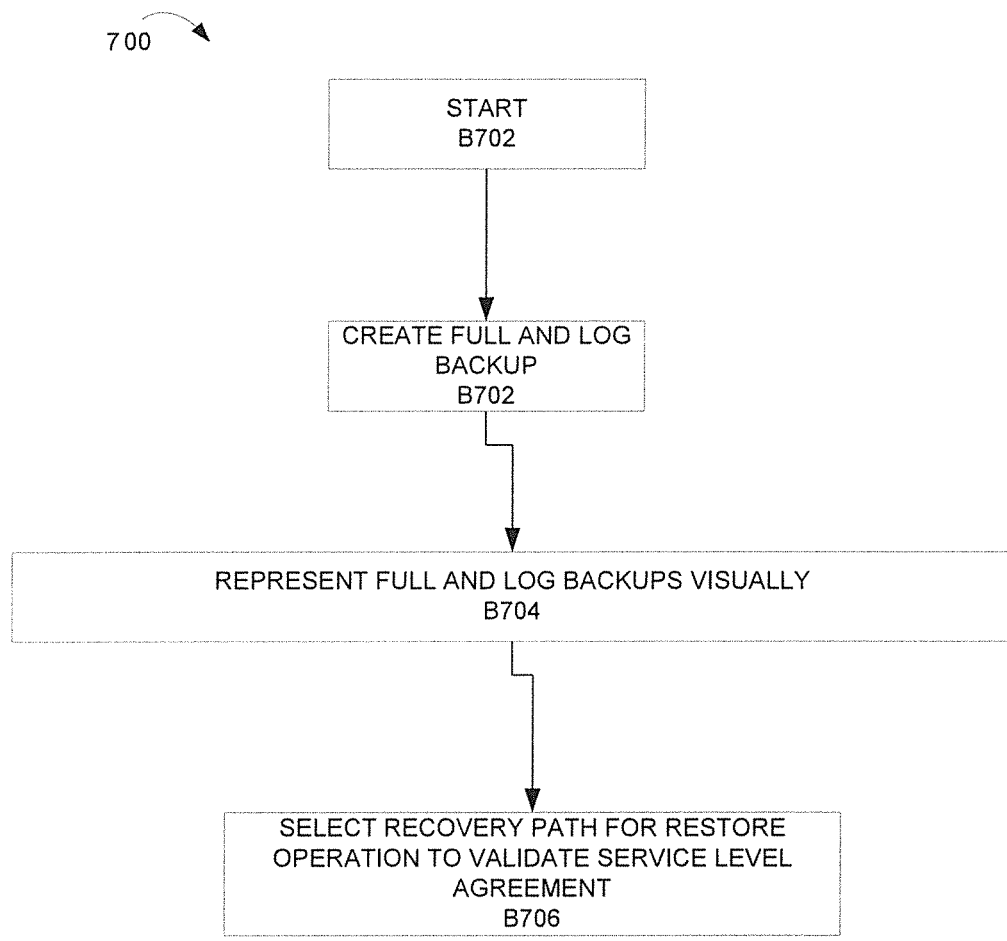
FIG. 7 illustrates a process for displaying full and log backups for recovery, according to one aspect of the present disclosure.

Process Flow:

FIG. 7 shows a flow chart 700 for representing backups and log backups in a GUI for estimating recovery times and validating SLA requirements, according to one aspect of the present disclosure. At block B702, first a full backup is created for database 104 by the backup creation unit 108. The full backup can be a snapshot or any other backup type that creates a complete copy of the data in a database. The full backup can be automatically created according to a schedule or policy as defined by policy data structure 128. Alternatively, a full backup may be created on-demand. Once the full backup is taken, one or more log backups of the database are also created. As discussed above, a log backup is an incremental backup of changes to the database since a previous log backup. The log backup can be any type of incremental backup, including a transaction log backup, a redo log backup, a differential backup, etc. Log backups may also be automatically created according to a schedule or policy or on-demand.

Information regarding the backups is stored at the backup data structure 140. The information includes backup identifiers, data containers associated with the backups, clients associated with the backups and any other information. The block B702 operations may be repeated as desired such that a series of full backups and log backups are created. The log backups that are created after a full backup are associated to the full backup using any of the methods described above. A log backup chain can be continued (e.g., additional log backups added to the chain) until a database restore operation occurs (assuming none of the log backups in the sequence are deleted or otherwise missing).

In block B704, the full backups and log backups are represented graphically within a user interface. Information stored at data structure 140 is used to display the full and log backups. FIG. 9 shows an example of a display 900 that may be displayed on a display device. Display 900 may have a recovery inventory segment 902 and a SLA validation segment 914, described below in detail. Multiple time bands may be used to visualize multiple sources of usable data for recovery within recovery inventory segment 902. Full backups 906A-906N at the primary repository and the secondary backups 908A-908N may be displayed over a time-line. The log backups at the primary repository are shown as a linear line 910, while the log backups at the secondary repository are shown as 912. The full backups and log backups may be represented by using the backup ID and/or timestamps as described above. The recovery inventory 902 is generated based on backups that may be taken by multiple resources. The recovery inventory 902 displays successful backups as well as failed backups In block B706, a recovery path is selected for restoring a database. In one aspect, the recovery path is selected using the display of FIG. 9. An estimated duration to complete the restore operation is then computed and compared to a SLA duration for the application, database or the user. The estimate maybe referred to as RTO (recovery time object) estimate. If the estimate does not meet the SLA duration, then the SLA violation maybe displayed, shown as 916. Details regarding SLA validation are now provided below with respect to FIG. 8.

Figure 8:
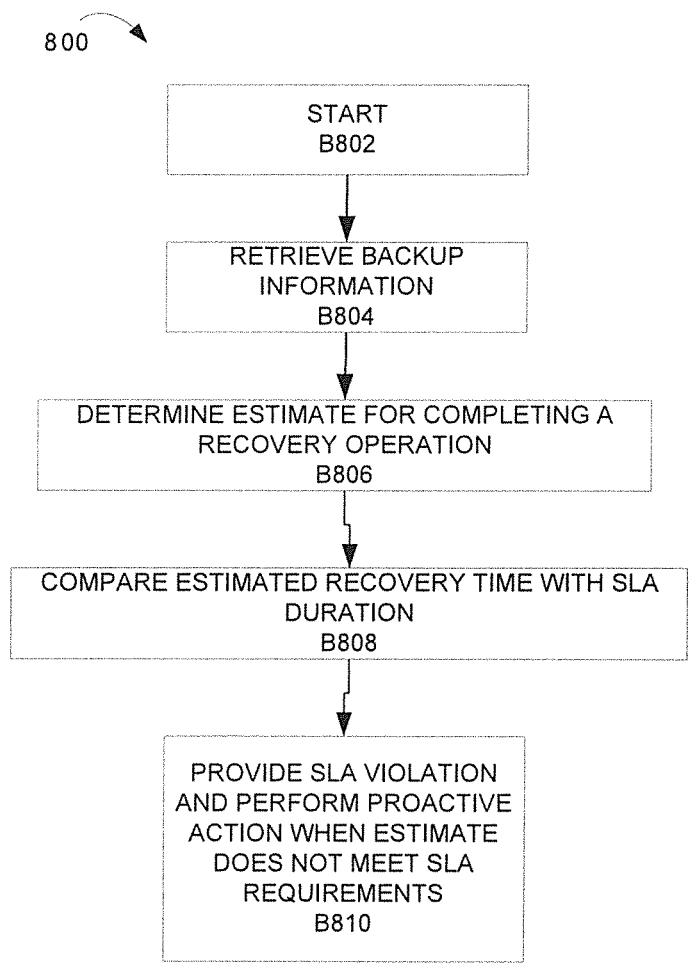
FIG. 8 illustrates a process for service level agreement validation for a restore operation, according to one aspect of the present disclosure.
Figure 9:
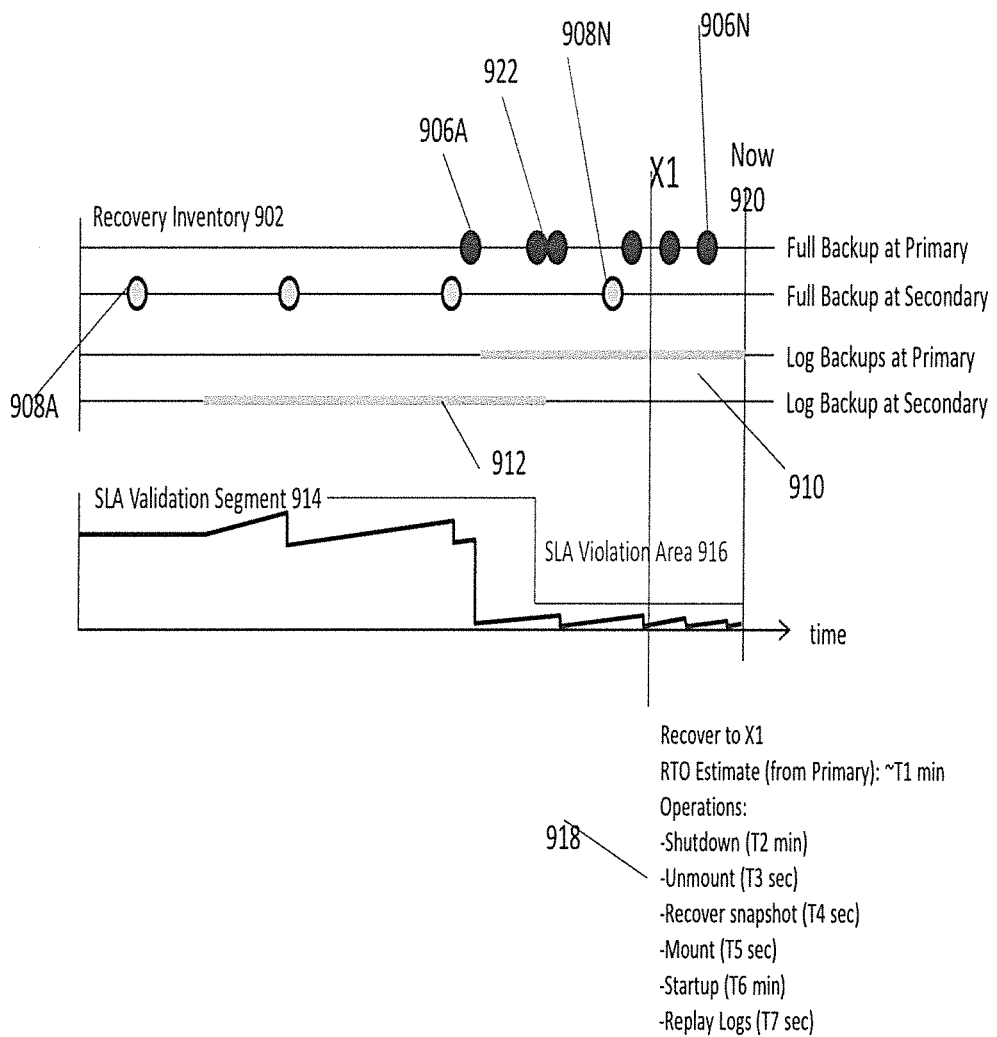
FIG. 9 shows an example of displaying full and log backups for service level validation, according to one aspect of the present disclosure.

FIG. 8 is a flow chart 800 illustrating example operations for a restore process using a recovery path that may include log backups associated with a selected full backup for compliance with a SLA. The process begins in block B802 when a backup is selected for the restore operation using a specific recovery path. A database recovery operation may comprise an operation or command to restore a database to a particular point in time after creation of a full backup of the database. In such an example, a user may select a full backup to be used to restore the database. The backup may be selected from the primary or secondary location as shown in FIG. 9.

At block B804, for selecting a recovery path, the restore unit 110 reads the information for the selected full backup and when available, information for log backups that are associated with the full backup. In one aspect, instead of scanning a file system for appropriate files or file types, or scanning one or more directories or folders for the log backups, the display of FIG. 9 provides a tool for selecting the appropriate log backup.

At block B806, the management application 106 identifies a recovery path that may include log backups and an estimate to complete the operation is determined. The estimate is displayed in segment 918 of FIG. 9. For example, as shown in FIG. 9, assume that the database is to be restored at duration X1. The recovery path involves a full backup and log backups at the primary repository. The management application 106 determines a time estimate for completing the recovery operation (shown as T1 in segment 918). The recovery operation may involve various operations, for example, shutting down the database for client use, unmounting the database, recovering a full backup, mounting the database and startup. The recovery operation may also include "replay logs" i.e. applying log backups after the full backup is used. The estimated time for each of these operations may be based on laboratory tests and evaluation or may be developed by monitoring storage systems over time. The various operations may be completed in different durations, shown as T2 to T7 in segment 918.

In block B808, the estimate from block B806 is compared by the management application 106 with a target duration that is based on a SLA. The target duration may be configured during a configuration process (not shown). As described above, the SLA information may be stored at a data structure that is accessible to the management application 106. FIG. 9 shows the comparison between SLA and the estimated time to complete the restore operation. When the SLA is violated it is represented by SLA violation area 916.

At block B810, if there is a SLA violation, appropriate corrective action may be taken, for example, selecting another full backup, using fewer log backups, only using the fullback and other actions.

In one aspect, full backups are represented as points, while log backups are represented as a time range. A full backup within a log interval allows a database to be closest to a desired time. A backup failure (922, FIG. 9) may be shown in a different color (for example, red) with error messages. This enables the user to investigate failures for specific backups.

In one aspect, SLA validation is performed using RTO estimates for different operations. A time slider shown as X1 and 920 in FIG. 9 enables verification of SLA requirements and allows the user to adjust and optimize the recovery path to comply with SLA requirements. The SLA validation also enables a storage provider to verify what SLOs are attainable for certain operating environments and SLAs it can agree to.

In one aspect, computer program code for carrying out the foregoing operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Figure 10:
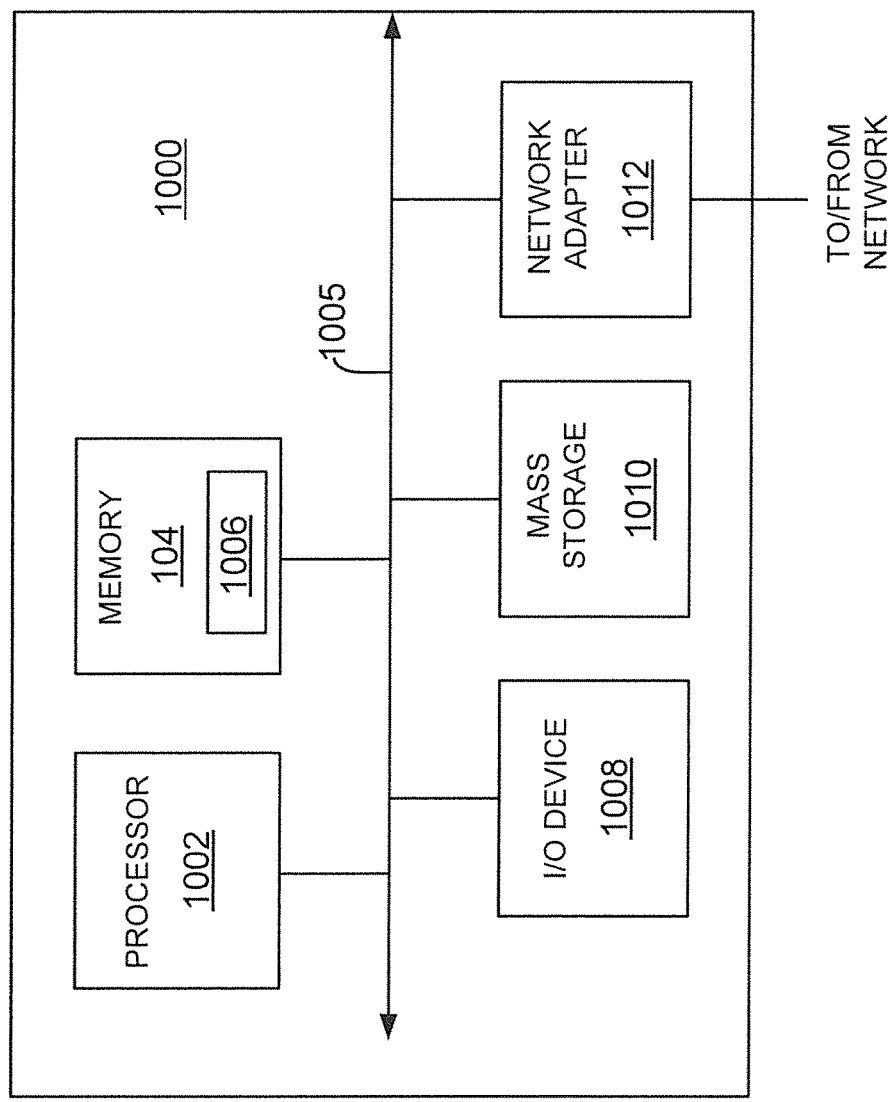
FIG. 10 illustrates an example of a computing device, used according to one aspect of the present disclosure.

Processing System:

FIG. 10 is a high-level block diagram showing an example of the architecture of a processing system, at a high level, in which executable instructions as described above can be implemented. The processing system 1000 can represent host system 102, a management console executing management application 106 and others. Note that certain standard and well-known components which are not germane to the various aspects of this disclosure are not shown in FIG. 10.

The processing system 1000 includes one or more processors 1002 and memory 1004, coupled to a bus system 1005. The bus system 1005 shown in FIG. 10 is an abstraction that represents any one or more separate physical buses and/or point-to-point point connections, connected by appropriate bridges, adapters and/or controllers. The bus system 1005, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 1002 are the central processing units (CPUs) of the processing system 1000 and, thus, control its overall operation. In certain aspects, the processors 1002 accomplish this by executing programmable instructions stored in memory 1004. A processor 1002 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1004 represents any form of random access memory (RAM), read-only memory (ROM), flash memory, or the like, or a combination of such devices. Memory 1004 includes the main memory of the processing system 1000. Instructions 1006 which implement the various techniques/process flows introduced above may reside in and may be executed (by processors 1002) from memory 1004. It is noteworthy that portions of instructions 1006 may be executed by different processors out of different memory devices.

Also connected to the processors 1002 through the bus system 1005 are one or more internal mass storage devices 1010, and a network adapter 1012. Internal mass storage devices 1010 may be or may include any conventional medium for storing large volumes of data in a non-volatile manner, such as one or more magnetic or optical based disks. Storage device 1010 may store instructions and data for backup creation unit 108 and restore unit 110 that facilitate associating log backups with corresponding full backups to automatically identify recovery branches.

The network adapter 1012 provides the processing system 1000 with the ability to communicate with remote devices (e.g., storage servers) over a network and may be, for example, an Ethernet adapter, a Fibre Channel adapter, or the like. The processing system 1000 also includes one or more input/output (I/O) devices 1008 coupled to the bus system 1005. The I/O devices 1008 may include, for example, a display device, a keyboard, a mouse, etc.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Aspects of the disclosure are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Cloud Computing:

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems and management application described above can be a part of the server layer for providing storage services. Details regarding these layers are not germane to the inventive aspects.

Thus, methods and apparatus for restoring data containers have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
    associating by a processor, a first set of incremental backups with a first full backup of a data container and a second set of incremental backups with a second full backup of the data container;
    generating by the processor, a first recovery path comprising the first full backup and the first set of incremental backups, and a second recovery path comprising the second full backup and the second set of incremental backups for restoring the data container by executing a plurality of operations;
    estimating by the processor, a duration for completing the plurality of operations for restoring the data container using the first recovery path and the second recovery path;
    validating by the processor that the estimated duration for the first recovery path and the second recovery path meet a target duration;
    selecting between the first recovery path and the second recovery path based on the estimated duration for completing the plurality of operations within the target duration;
    executing by the processor the plurality of operations for restoring the data container using the selected recovery path; and
    generating by the processor an error when the plurality of operations for restoring the data container cannot be completed within the target duration.

2. The method of claim 1, wherein the data container is a database and the first set of incremental backups comprise one or more log backups of the database.

3. The method of claim 2, wherein the one or more log backups are associated with the first full backup using a backup identifier.

4. The method of claim 1, wherein the association of the first set of incremental backups with the first full backup is presented via a graphical user interface by the processor.

5. The method of claim 4, wherein the presentation provides an option for selecting between the first recovery path and the second recovery path using a primary storage location or a secondary storage location for restoring the data container.

6. The method of claim 1, wherein the target duration for completing the plurality of operations for restoring the data container is part of a service level objective for an application guaranteeing a restoration time for the data container based on a service level agreement (SLA).

7. The method of claim 6, wherein a graphical user interface displays the plurality of operations for restoring the data container with associated estimated durations and a SLA violation segment displays SLA violation for the plurality of operations based on using the first recovery path and the second recovery path.

8. A non-transitory machine readable medium having stored thereon instructions comprising machine executable code which when executed by a machine, causes the machine to:
    associate by a processor a first set of incremental backups with a first full backup of a data container and a second set of incremental backups with a second full backup of the data container;
    generate by the processor, a first recovery path comprising the first full backup and the first set of incremental backups, and a second recovery path comprising the second full backup and the second set of incremental backups for restoring the data container by executing a plurality of operations;

estimate by the processor a duration for completing the plurality of operations for restoring the data container using the first recovery path and the second recovery path;

validate by the processor that the estimated duration for the first recovery path and the second recovery path meet a target duration;

select between the first recovery path and the second recovery path based on the estimated duration for completing the plurality of operations within the target duration;

execute by the processor the plurality of operations for restoring the data container using the selected recovery path; and generate by the processor an error when the plurality of operations for restoring the data container cannot be completed within the target duration.

9. The storage medium of claim 8, wherein the data container is a database and the first set of incremental backups comprise one or more log backups of the database.

10. The storage medium of claim 9, wherein the one or more log backups are associated with the first full backup using a backup identifier.

11. The storage medium of claim 8, wherein the association of the first set of incremental backups with the first full backup is presented via a graphical user interface by the processor.

12. The storage medium of claim 11, wherein the presentation provides an option for selecting between the first recovery path and the second recovery path using a primary storage location or a secondary storage location for restoring the data container.

13. The storage medium of claim 8, wherein the target duration for completing the plurality of operations for restoring the data container is part of a service level objective for an application guaranteeing a restoration time for the data container based on a service level agreement (SLA).

14. The storage medium of claim 13, wherein a graphical user interface displays the plurality of operations for restoring the data container with associated estimated durations and a SLA violation segment displays SLA violation for the plurality of operations based on using the first recovery path and the second recovery path.

15. An apparatus comprising:
a processor; and
a machine readable storage medium having machine executable code stored therein that is executable by the processor to cause the apparatus to:
associate a first set of incremental backups with a first full backup of a data container and a second set of incremental backups with a second full backup of the data container;
generate a first recovery path comprising the first full backup and the first set of incremental backups, and a second recovery path comprising the second full backup and the second set of incremental backups for restoring the data container by executing a plurality of operations;
estimate a duration for completing the plurality of operations for restoring the data container using the first recovery path and the second recovery path;
validate that the estimated duration for the first recovery path and the second recovery path meet a target duration;
select between the first recovery path and the second recovery path based on the estimated duration for completing the plurality of operations within the target duration;
execute the plurality of operations for restoring the data container using the selected recovery path; and
generate an error when the plurality of operations for restoring the data container cannot be completed within the target duration.

16. The apparatus of claim 15, wherein the data container is a database and the first set of incremental backups comprise one or more log backups of the database.

17. The apparatus of claim 16, wherein the one or more log backups are associated with the first full backup using a backup identifier.

18. The apparatus of claim 15, wherein the association of the first set of incremental backups with the first full backup is presented via a graphical user interface by the processor.

19. The apparatus of claim 18, wherein the presentation provides an option for selecting between the first recovery path and the second recovery path using a primary storage location or a secondary storage location for restoring the data container.

20. The apparatus of claim 14, wherein the target duration for completing the plurality of operations for restoring the data container is part of a service level objective for an application guaranteeing a restoration time for the data container based on a service level agreement (SLA).

\* \* \* \* \*